United States Patent
Paavola et al.

(10) Patent No.: US 7,023,480 B2
(45) Date of Patent: Apr. 4, 2006

(54) ALIGNED MOUNTING OF A PHOTODETECTOR ARRAY IN A COLOR SPLITTING PRISM

(75) Inventors: Jyri Paavola, Kerava (FI); Lasse Lindström, Nummela (FI)

(73) Assignee: Oy Ekspansio Engineering Ltd., Kerava (FI)

( * ) Notice: Subject to any disclaimer, the term of this patent is extended or adjusted under 35 U.S.C. 154(b) by 797 days.

(21) Appl. No.: 09/878,768

(22) Filed: Jun. 11, 2001

(65) Prior Publication Data

US 2002/0051073 A1    May 2, 2002

(30) Foreign Application Priority Data

Jun. 12, 2000   (FI) .................... 20001389

(51) Int. Cl.
H04N 9/09    (2006.01)
H04N 5/225   (2006.01)

(52) U.S. Cl. ................ 348/265; 348/374
(58) Field of Classification Search ........ 348/373–376, 348/335, 326, 338, 343, 190, 95
See application file for complete search history.

(56) References Cited

U.S. PATENT DOCUMENTS

| | | | |
|---|---|---|---|
| 4,323,918 A | | 4/1982 | Bendell |
| 4,591,901 A | * | 5/1986 | Andrevski ............... 348/337 |
| 4,789,891 A | | 12/1988 | Kanayama et al. |
| 4,814,895 A | | 3/1989 | Harada et al. |
| 4,835,600 A | | 5/1989 | Harada et al. |
| 4,916,529 A | * | 4/1990 | Yamamoto et al. ......... 348/337 |
| 5,042,913 A | * | 8/1991 | Yamamoto ................ 359/540 |
| 5,134,468 A | * | 7/1992 | Ohmuro .................... 348/337 |
| 5,315,384 A | * | 5/1994 | Heffington et al. ........... 348/93 |
| 5,508,740 A | * | 4/1996 | Miyaguchi et al. ......... 348/244 |
| 5,570,231 A | | 10/1996 | Mogamiya |
| 5,596,228 A | | 1/1997 | Anderton et al. |
| 6,307,590 B1 | * | 10/2001 | Yoshida ................... 348/340 |
| 6,614,478 B1 | * | 9/2003 | Mead ...................... 348/337 |

FOREIGN PATENT DOCUMENTS

| | | | |
|---|---|---|---|
| JP | 61118707 A | * | 6/1986 |
| JP | 6120590 | | 9/1986 |

(Continued)

OTHER PUBLICATIONS

Abstract of JP 63-90985, Inventor Takashi Omuro(1), Published Apr. 21, 1988, Japan.

(Continued)

Primary Examiner—Ngoc-Yen Vu
Assistant Examiner—Timothy J. Henn
(74) Attorney, Agent, or Firm—Alfred A. Fressola; Ware, Fressola, Van Der Sluys & Adolphson LLP

(57) ABSTRACT

A joining construction is described for mounting the CCD cells of a color line camera on a color splitting prism (30) attached to a prism housing (2) for each CCD cell (6, 7, 8) attached by a first glue joint (13), to its fastening element (9), the length (L2) whereof is essentially larger than the length (L1) of the CCD cell, and which fastening element (9) extends from the housing margin (12a) located on one side of said exit surface (20a, 20b, 20c) of the color splitting prism to the other housing margin (12b) located on the opposite side thereof. Each fastening element (9) is attached to said margins by third glue joints (11).

30 Claims, 4 Drawing Sheets

FOREIGN PATENT DOCUMENTS

| | | | |
|---|---|---|---|
| JP | 01186066 | | 7/1989 |
| JP | 08322055 | A * | 12/1996 |
| JP | 10234049 | A * | 9/1998 |
| JP | 11289072 | | 10/1999 |
| WO | 9613930 | | 5/1986 |

OTHER PUBLICATIONS

Abstract of JP 4-290090, Inventor Yashushi Atsuta(2), Published Oct. 14, 1992, Japan.

Abstract of JP61258595, Inventor Yamada Masakazu, Published Nov. 15, 1986, Japan.

* cited by examiner

ALIGNED MOUNTING OF A PHOTODETECTOR ARRAY IN A COLOR SPLITTING PRISM

TECHNICAL FIELD

The invention relates to a joining construction for mounting CCD cells of a color line camera in an aligned fashion in a color splitting prism, which is attached to a prism housing, said joining construction comprising fastening elements attached by glue joints between the color splitting prism and each CCD cell. The invention also relates to a method for mounting CCD cells of a color line camera on a color splitting prism, which is in advance attached to a housing, in which method said CCD cell is fastened by gluing in its position after being aligned.

BACKGROUND OF THE INVENTION

A color line camera that is used, among others, for industrial real-time quality control, is composed of a color splitting prism, for instance of three linear CCD (Charge Coupled Device) cells, which thus include a line of single CCD elements, plus electronics. A CCD cell can include for example 1024 or 2048 light-sensitive CCD elements with a size that can vary for instance within the range 7–13 μm. A color splitting prism is a prism array compiled of several prism elements, and generally it separates the light emitted from the target through an objective, as well as the corresponding image information, in three partial colors, i.e. red, green and blue, so that partial images of different colors are created on different exit surfaces of the color splitting prism, or on image surfaces located in the vicinity of said exit surfaces. In order to make the CCD cells see the same spot in said three images, the CCD cells must be aligned accurately, at the precision of a few μm:s with respect to each other, and said alignment must be maintained both during the drying period of the glue and during the working period, when the cell is heated. There also exist surface-type CCD cells that include large numbers of CCD element rows, but the present invention concentrates in mounting linear CCD cells on the surface of a color splitting prism.

In the publications JP-4-290090 and WO-96/13930, there are used arrangements where the CCD cells are attached directly on the exit surfaces of the partial images of the color splitting prism by glue that is applied in between the prism and the cell. According to the publication WO-96/13930, there is used epoxy glue, in which case there arises the problem whether there is time to perform the alignment before the glue is hardened, as well as the thermal expansion coefficient of glue, which is different from that of glass. In the method according to the publication JP-4-290090, there is used a glue that is polymerized by means of ultraviolet light and heat, so that after applying the glue, the CCD cell is pressed on the prism surface and aligned, and the glue is hardened by irradiating with ultraviolet light. Here the problem is the thermal expansion coefficient of glue, which is different from that of glass. From the publication U.S. Pat. No. 4,323,918 there is known an arrangement where on the exit surfaces of the color splitting prism, there are first provided trimming filters, on the outer surface of which the CCD cell is attached. In order to attach it, in between the trimming filter and the CCD cell, there is inserted a spacer that is somewhat smaller than the cell and is provided with an air pocket for the radiation directed to the cell. The spacer keeps the CCD cell at the right distance from the color splitting prism, i.e. on the correct image plane, and it is made of a material that has the same thermal expansion coefficient as the prism, in order to maintain the cell alignment in place. Said spacer has rounded outer margins, and around the margins, the spacer is glued both to the CCD cell and to the trimming filter by means of external glue strips. Also in this arrangement, the problem is that the thermal expansion coefficient of the glue is different from the thermal expansion coefficient of the prism glass. Actually the fact that the spacer and the prism materials have the same thermal expansion coefficient does not remarkably reduce alignment errors, because said elements are heated at different speeds or remain at different temperatures.

From the publication JP-63-90985 there is known an alignment structure, where the CCD cells are attached on the exit surfaces of the color splitting prism by glue, by employing adjusting pieces between the prism and the element at opposite margins of the CCD cell. Each adjusting piece is glued to the CCD cell and to the prism exit surface by means of a glue that is hardened by ultraviolet light, in which case the cell can be moved, before the glue is hardened, with respect to the support elements, and the support elements can likewise be moved with respect to the prism. The purpose of the support elements is to reduce the deviation caused by the different thermal expansion coefficients of glue and glass in relation to the focusing and alignment, i.e. during the use of the apparatus.

Another problem related to the above described methods is that the glues shrink during the hardening process and consequently move the CCD cell, and thus the CCD cells are not reliably in their correct positions after the glue is hardened. On the other hand, while gluing a CCD cell directly onto the prism, the viscosity of the glue and its uneven distribution result in that the CCD cell is moved and must be aligned several times during the hardening process of the glue. Moreover, the heating of the CCD cell during use creates internal tensions in the glue layer, because the color splitting prism is not heated, or is heated at a different pace than the cell, which may cause the cell alignment to change, or even the element to fall off.

When employing above described ways to attach CCD cells, a common drawback is that heat is transferred out of the cell. Owing to the structure and properties of CCD cells, their noises as well as the basic signal levels are changed along with the temperature. The publication U.S. Pat. No. 5,596,228 discloses a cooling arrangement for a CCD cell, which arrangement comprises a thermally conductive cooling piece arranged against the rear surface of the cell, and a thermoelectric cooler, i.e. a so-called Peltier element, arranged against its outer surface. From the Peltier element, heat is conducted further away by means of a thermodynamic heat pipe based on Carnot cycle. The arrangement heats the CCD cell efficiently, but it is complicated in structure and therefore expensive, and consumes a lot of energy. Said publication does not mention that the CCD cell should be attached to an optical component, such as a prism or the like. On the other hand, it is mentioned that the CCD cell can replace film, for instance, which means that the cooler described in the specification is neither meant for a CCD line cell nor to be used together with a color splitting prism, but it is meant to be combined to a single CCD surface cell provided with a large number of element rows. When this type of a surface cell is meant for one-color, i.e. black and white imaging, each pixel therein is formed of one CCD element, and when the surface cell is meant for color imaging, each pixel is formed of three adjacent CCD elements, and in front of each CCD element, there is arranged one of the three color separation filters. These types of CCD surface cells are placed at a distance from the objective, so that the difference in temperature between the optical parts and the cell does not cause any problems. Also, the problem with alignment does not arise with these arrangements, because the electric signals corresponding to all three colors are created in one and the same CCD cell, in adjacent CCD elements.

SUMMARY OF THE INVENTION

Thus the first object of the invention is to realize a joining construction and method for mounting linear CCD cells on a color splitting prism by gluing, so that the alignment of the CCD cell is maintained during the hardening process of the glue, irrespective of the hardening shrinkage of the glue or a possible unevenness of the glue layer. Another object of the invention is to realize a described joining construction and gluing method, as a result whereof the different temperatures of the CCD cells and the color splitting prism result in a minimal focusing and/or alignment error between the CCD cells provided for different colors. A third object of the invention is to realize a described joining construction and gluing method, which enable a simple construction for the CCD cells and the color splitting prism and result in a solid structure that endures vibration, for example. Yet another object of the invention is to realize a described joining construction and gluing method, as a result whereof the temperature different between the color splitting prism and the CCD cells mounted thereon is, when required, made minimal.

The above described problems and drawbacks are eliminated and the above mentioned objects are achieved by means of the joining construction according to the invention, where the joining construction comprises fastening elements having a length substantially larger than the length of the CCD cell and extending from a housing margin on one side of a light exit surface of said color splitting prism to another housing margin on the opposite side of said light exit surface, a first glue joint between the CCD cell and its fastening element, and third glue joints said fastening element and said margins of the housing; As well as by means of the method according to the invention, where the mounting of each CCD cell onto the prism comprises the steps of creating a thermally conductive surface contact between the CCD cell and a fastening element that is essentially larger than the CCD cell by joining them together with a first glue, aligning the fastening element with the attached CCD cell at the correct position on said prism exit surface, and gluing the fastening element, while maintaining the obtained alignment of the CCD cell, at least at two front surfaces located in the area of its outer margins and having areas substantially smaller than the area of the CCD cell, with a third glue to the prism housing.

By means of the invention, where—opposite to said publications described above—the CCD cells are attached, instead of the color splitting prism itself, to the housing of said prism by means of a fastening element that is essentially larger than the cell, the effects of the harmful properties of glues, i.e. hardening shrinkage and thermal expansion, are sufficiently eliminated. By means of the small fastening area between the fastening element and the housing of the color splitting prism, heat transfer therebetween is reduced. Surprisingly, by means of a preferred embodiment of the invention, i.e. by using the Peltier element, there are achieved several advantages: the noise of the CCD cell is reduced and the basic signal level is improved, and in addition, the temperature difference between the CCD cells and the color splitting prism is reduced, which improves the stability f the focusing and alignment while using the arrangement.

BRIEF DESCRIPTION OF THE DRAWINGS

The invention is described in more detail below with reference to the appended drawings.

BEST MODE FOR CARRYING OUT THE INVENTION

Figure 1:
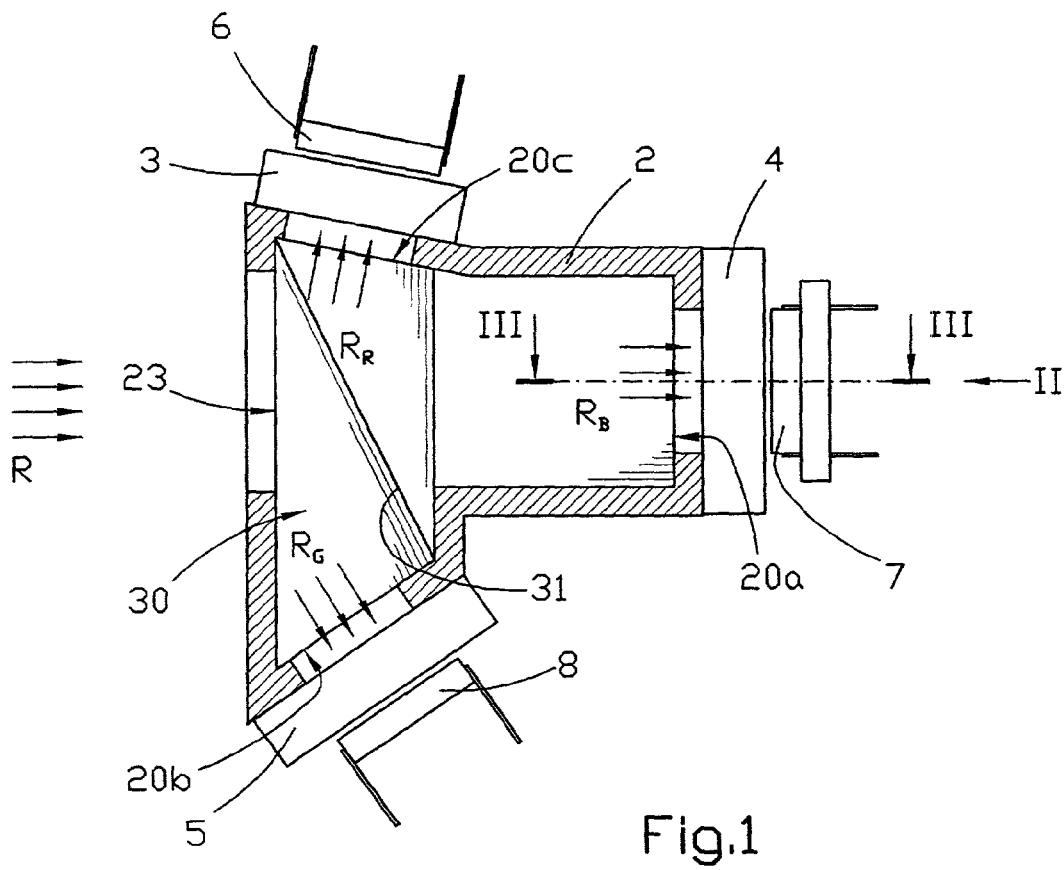
FIG. 1 illustrates a color splitting prism complete with its housing and the placing of three linear CCD cells on three exit surfaces of a color splitting prism, seen in a vertical cross-section against the color splitting prism exit surfaces, along the plane I—I of FIG. 4.

In the drawings, the light R emitted from an objective or the like, which is not illustrated, enters the color splitting prism 30 through its front surface 23 and is in the prism split, for instance owing to the effect of the boundary surface 31, into three parts that come out of the prism through the exit surfaces 20*a*, 20*b* and 20*c*, and through three color separation filters 3, 4 and 5 as lights $R_R$, $R_G$ and $R_B$, each containing a partial image with a different color. Thereafter the light rays coming through the color separation filters 3, 4 and 5 are respectively detected by three linear CCD cells 6, 7 and 8. The color splitting prisms 30 can differ in their inner structure, in which case the picture information can also be divided into two or more than three partial images, and respectively the color separation filters 3, 4 and 5 can represent different types and have different transmission specters according to the target of usage, including, when necessary, ultraviolet and/or infrared areas, but the joining construction and method according to the invention can be applied in connection with all of said prisms and filters. Color splitting prisms and color separation filters are generally known and shall not be described in more detail in this specification. The color splitting prism 30 is in advance coupled to the prism housing 2 by a known or a novel method, and the material of the housing can be metal or glass or ceramics. The use of a suitable ceramic material in the housing 2 of the color splitting prism is not compulsory but advantageous, because at present there are obtained good mechanical properties for ceramics, including strength and impact resistance, and at the same time its thermal expansion coefficient can be arranged to be of the same order as the thermal expansion coefficient of the prism. The entity comprising the color splitting prism 30, the color separation filters 3, 4 and 5 and the CCD cells 6, 7 and 8 form, together with the not illustrated objective, the basic elements of a color line camera, although a complete apparatus naturally includes other additional components known as such. In this kind of a color line camera, the CCD cells are mounted, with respect to the color splitting prism, in an aligned fashion by means of a joining construction, so that the same image of the target falls on the CCD cells 6, 7 and 8.

According to the invention, each CCD cell 6, 7 and 8 is along its whole rear surface 27, i.e. along the side that is opposite to the input window 26 receiving light $R_R$, $R_G$ and $R_B$, attached to the fastening element 9, the length L2 whereof is essentially larger than the length L1 of the CCD cell. This first glue joint 13 is made as the first fastening step of the joining construction, and the purpose is to create, between the CCD cell 6, 7, 8 and the larger fastening element 9, a surface contact with a maximum thermal conductivity by joining them together with a first glue 13 that has a good thermal conductivity. At this stage, it is not necessary to perform an alignment proper, but it suffices that the CCD cell is positioned at such a normal production accuracy at the proper place of the fastening element that it can in the next step be aligned at the correct position. The area of this first glue joint 13 is generally roughly the same as the area A3 of the CCD cell, which enhances heat transfer between the cell and the fastening element 9.

The length L2 of said large fastening element 9 is somewhat larger than the height H of the prism exit surface 20a, 20b, 20c, so that the fastening element extends at least from the margin 12a of the housing, located on one side of said exit surface of the color splitting prism 30, to the margin 12b of the housing, located on the opposite side of said exit surface, i.e. from one side of the prism to the other. Now it must be observed that the linear cells 6, 7 and 8, can be placed at least in two different positions on the exit surfaces of the color splitting prism 30, so that in one position, the length L1 of the cell is parallel to the top and bottom surfaces that are perpendicular to the boundary surface 31, i.e. parallel to the image plane in FIGS. 1–3, and that in the other position, the length L1 of the cell is perpendicular to the boundary surface 31 placed at right angles to the top and bottom surfaces, i.e. in FIGS. 1 and 5 perpendicular to the image plane, and in FIG. 4 parallel to the image plane. In cross-section, the fastening element 9 of the CCD cell has the shape of a right-angled]-profile that opens towards the prism 30, which comprises end flanges 34 protruding at least in one direction, i.e. towards the prism, and a connecting web part 35, which at least in the area of the CCD cell has a smooth inner surface between the flanges. The CCD cell is attached to the inner surface of the web part 35 by a first glue layer 13, so that said inner surface points towards the exit surface of the prism. The end flanges 34 or end branches form the front surfaces 27a, 27b, which are essentially parallel to the photosensitive surface 26 of the CCD cell 19a, 19b, 19c. The single areas Al of said front surfaces 27a, 27b, as far as they get into contact with the housing margins 12a, 12b, constitute no more than 20% or no less than 10% of the even area A2 of the active side of the CCD cell, in order to make the thermally conductive surface between the housing 2 and the fastening element 9 as small as possible. Respectively, at each exit surface, said two margins 12a, 12b of the housing are essentially parallel to said exit surface 20a, 20b, 20c of the color splitting prism. Thus said front surfaces 27a, 27b are supported against said margins 12a, 12b of the housing, and the fastening element can be freely moved in the direction of the plane thereof during the alignment/ focusing of the CCD cell, while the contact between the front surfaces and the housing margins remains the same, which keeps the CCD cell at the right distance from the exit surface. The contact areas Al between the front surfaces and the housing, which are as small as possible, in part keep the heat transfer between the housing 2 and the fastening element 9 minimal.

In the second step, the fastening element 9 with the attached CCD cell 6, 7, 8 is aligned at the correct position said exit surface 20a, 20b or 20c of the prism, so that the front surfaces 27a, 27b of the fastening element 9 are slid along the housing margins 12a, 12b. Thereafter the fastening element 9 is glued, while the obtained alignment of the CCD cell is maintained, at said at least two front surfaces 27a, 27b located in the area of its outer margins, the areas Al of said front surfaces being, in a way described above, essentially smaller than the whole area A3 of the CCD cell, by a thermally insulating third glue 11 to the prism housing 2. It is to be understood that said front surface and housing margins, which shall thus be supported against each other, can be found in all four margins of the exit surface, but a smaller heat transfer can be achieved by using only two sides without still weakening the solidity of the construction, as will be described later on. Said third glue 11 can be applied either before bringing the margins 12a, 12b and the front surfaces 27a, 27b into mutual contact, or only after performing the alignment, at the boundary of the margins and front surfaces. When said thermally insulating third glue is hardened, the CCD cell is set in place in a preliminary fashion, and further steps are carried out only after the third glue 11 is hardened. Because there are two of said third glue joints 11, and their distance corresponds to the length L2 of the fastening element 9, which length is considerably larger—i.e. larger than is illustrated in the drawings, where measures are somewhat adjusted for the sake of clarity— than the cell length, the effect of the hardening shrinkage of the second glue joint 11, for example, to the alignment is minimal or nonexistent. Advantageously the material of the fastening element 9 is a metal, such as copper or aluminum or a copper or aluminum alloy.

Figure 5:
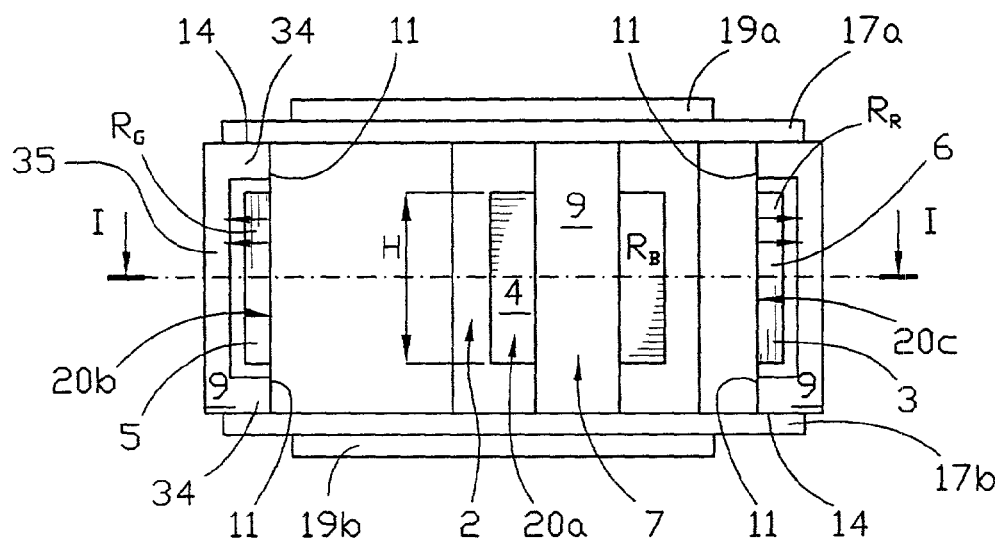
FIG. 5 is a general illustration of a color splitting prism, which is according to the invention provided with CCD cells and Peltier elements, seen at the side from the direction II of FIG. 1.
Figure 2:
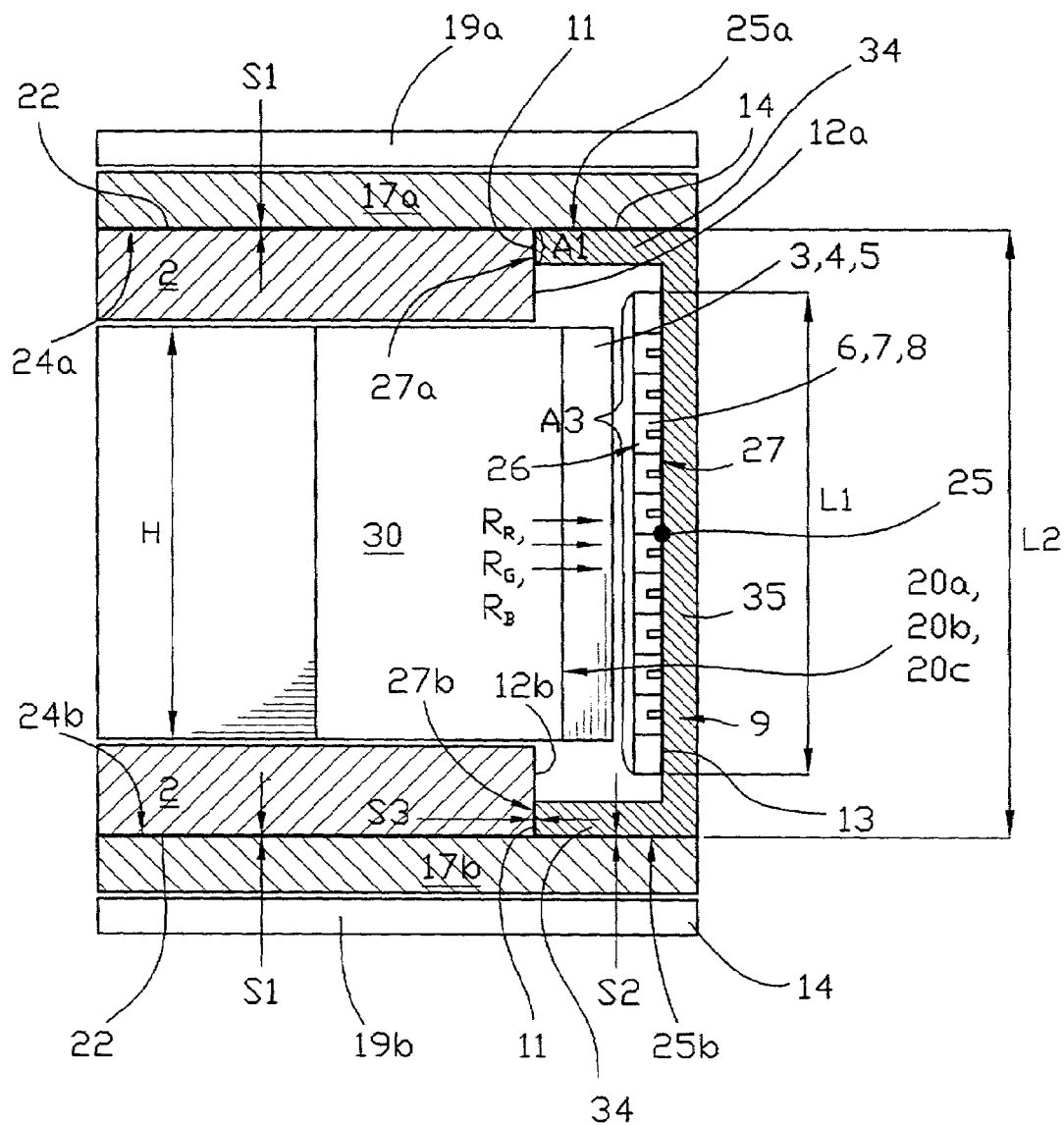
FIG. 2 illustrates a CCD cell and its fastening to the prism housing according to a preferred embodiment of the invention, seen in the same configuration as in FIG. 1, but in a larger size, so that the length of the linear CCD cell is seen in the direction of the image plane of FIG. 1.
Figure 3:
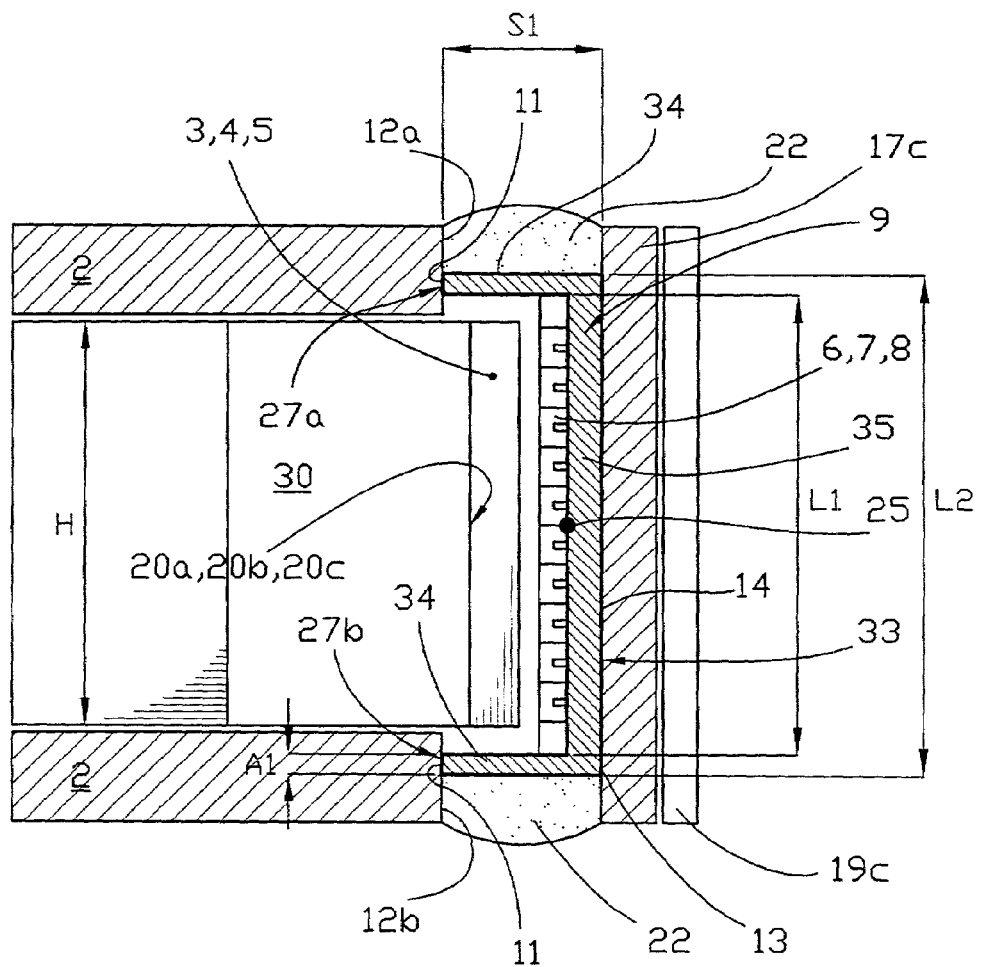
FIG. 3 illustrates a CCD cell and its fastening on the prism housing according to a second preferred embodiment of the invention, seen in the same configuration as in FIG. 2.
Figure 4:
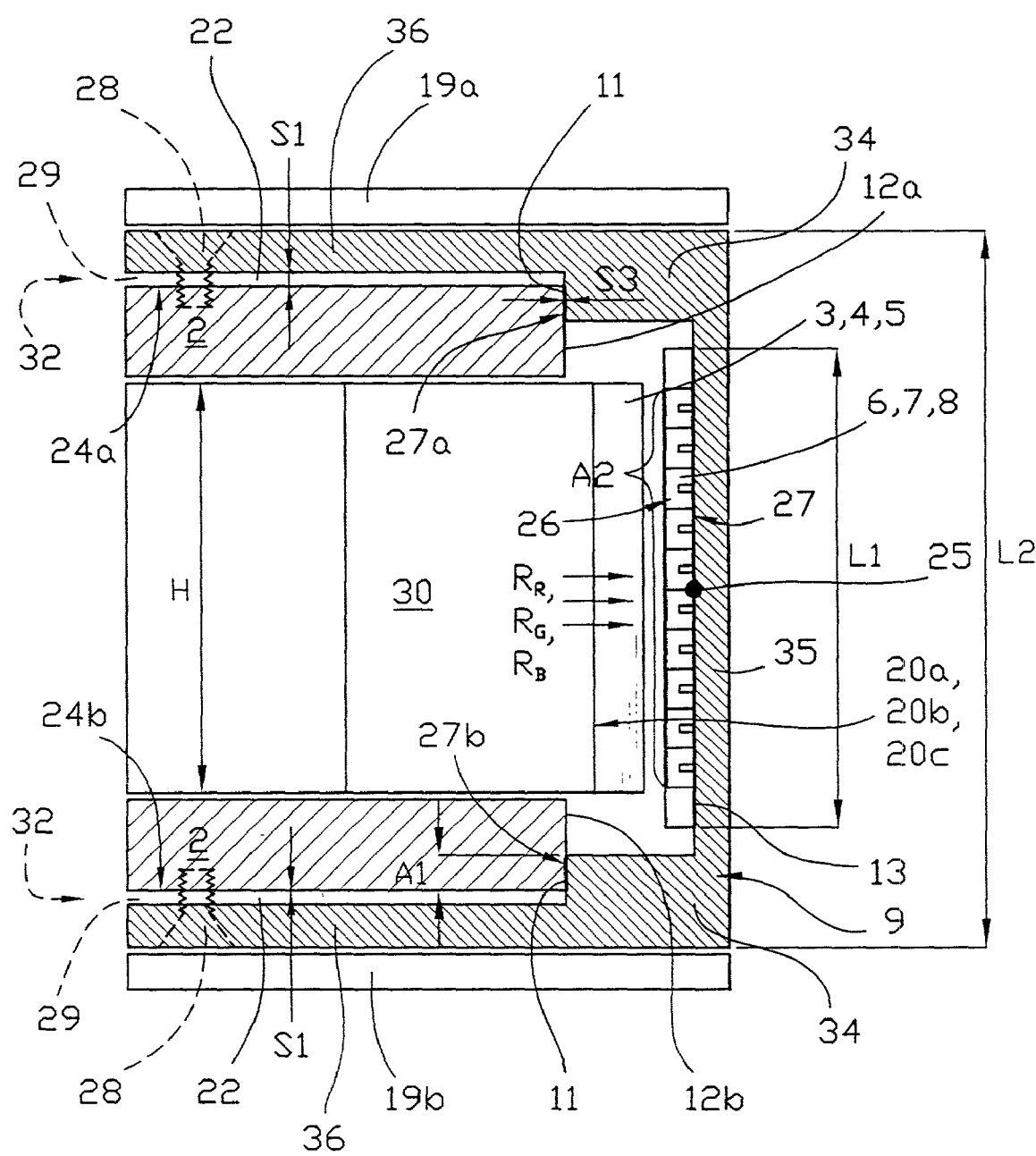
FIG. 4 illustrates a CCD cell and its fastening on the prism housing according to a third preferred embodiment of the invention, seen in the same configuration as in FIGS. 2 and 3, but in a section III—III of FIG. 1, so that the length of the linear CCD cell is seen in a vertical position against the image plane of FIG. 1.

In the embodiments of the invention illustrated in FIGS. 2 and 5, the joining construction also comprises for each CCD cell 6, 7, 8 heat distribution pieces 17a, 17b, which extend along the opposite sides 24a, 24b of the housing, at a distance S1 therefrom, and along the ends 25a, 25b of said fastening element 9. These heat distribution pieces are attached to the prism housing 2 by heat-insulating elements 22, 32, and in addition the ends 25a, 25b of each fastening element 9, i.e. the end sides opposite to the flanges 34, are attached to said heat distribution pieces 17a, 17b by second thermally conductive glue joints 14. The making of said second glue joints 14 constitutes the third step of the method. Said heat-insulating elements form a thermally insulating fourth glue joint 22, as is shown in FIG. 2, and/or a combination 32 of a thermally insulating layer 29 and screws 28, which structure is illustrated in FIG. 4. As an alternative, there can be used a heat distribution piece 17c, which is attached against the back side 33 of the fastening element 9 by a thermally conductive second glue joint 14, as is illustrated in the embodiment of FIG. 3. In this case the fastening element 9 is attached at its ends 25a, 25b and likewise the heat distribution piece 17c is attached at its ends by a thermally insulating fourth glue joint 22 or by a corresponding cast or molded plastic to the prism housing 2, for instance to its margins 12a, 12b. As yet another alternative, the fastening element 9 can be formed to comprise extensions 36 of the end flanges 34, which extend, along the opposite sides 24a, 24b of the housing, at a distance S1 therefrom, as is illustrated in FIG. 3, i.e. in a corresponding fashion as the heat distribution pieces 17a, 17b. The extensions 36 are created in connection with the production of the fastening element 9, wherefore they do not require a separate fastening step. By means of the thermally conductive second glue joints 14 and respectively by means of the extensions 36 of the flanges 34, there is obtained an ideal heat transfer between the fastening element 9 and the heat distribution pieces 17a, 17b, 17c by employing a large surface contact and by distributing the heat transfer in the area of the Peltier elements to be described below. By means of the heat-insulating elements 22, 32, i.e. by the thermally insulating fourth glue joint 22 or by the combination 32 of the thermally insulating layer 29 and mechanical fastening elements 28, the mounting of the CCD cell and its fastening element to the housing 2 is made as good as possible with respect to strength and rigidity, while the heat transfer to the housing is kept as small as possible, i.e. thermally insulating. The fourth glue joints 22, i.e. the thermally insulating layer 29 and the fastening of the mechanical fastening elements 28 is carried out as a fourth step after the glue of the second glue joints 14, which was made as the third step, is hardened. Advantageously the material of the heat distribution pieces 17a, 17b, 17c is a metal, such as copper or aluminum, or a copper or aluminum alloy.

According to the invention, the first glue joint 13 and the second glue joints 14 are made by a thermally conductive glue with a heat transfer coefficient of at least 0.6 W/m·K and advantageously at least 0.7 W/m·K, or even about 0.8 W/m·K or more. The third and fourth glue joints 11, 22 are made by a thermally insulating glue or cast/molded plastic with a heat transfer coefficient no more than 0.3 W/m K, and advantageously no more than 0.2 W/m·K, preferably about 0.1 W/m·K or less. As the thermally conductive first glue 13 and the second glue 14, there can be employed for instance a modified hardener-acrylic-based glue or a polystyrene-based glue. Suitable glues for this purpose are for example "Loctite 315", which is a registered trade mark of the Loctite Corporation and has a heat transfer coefficient of about 0.8 W/m·K, as well as the glue manufactured by the Fischer Elektronik GmbH, of the type WLK ("Wärmeleitkleber") with a heat transfer coefficient of about 0.82 W/m·K. As the third thermally insulating glue 11 and the fourth glue 22, there can be used a methacrylate-based glue or a glue based on a high-density polyester (with a density of over 2 g/cm$^3$). A suitable glue for this purpose is for instance "Loctite 3608", which is a registered trade mark of the Loctite Corporation and has a heat transfer coefficient of about 0.1 W/m·K.

The thickness S2 of the above described glue joints, i.e. of the first glue joint 13 and the second glue joint 14, is as small as possible, no more than 0.4 mm and advantageously no more than 0.2 mm, preferably no more than 0.1 mm. Among the thermally insulating glue joints, the thickness S3 of the third glue joints 11 must for the alignment and focusing be as thin as possible, but the heat transfer caused by said thinness is further eliminated by means of the area A1 of the third glue joints 11, which is made as small as possible—so that the front surfaces 27a, 27b can be made semi-circular or approaching a sharp V-shape, or only of the order of about 1 mm in thickness—and by means of the heat transfer coefficient of the glue employed at said spot, which coefficient is as low as possible. The lower limit for the thickness S1 of the thermally insulating fourth glue joint 22 and of the thermally insulating layer 29 can be considered to be 0.8 mm, but advantageously the thickness S1 is at least 1.5 mm. The thickness S1 can be even several millimeters, such as 2, 3 or 5 mm, unless the size and resulting weight of the structure sets other restrictions.

Further, the joining construction according to the invention comprises one or several Peltier elements 19a, 19b, 19c. In the embodiments of FIGS. 2 and 4, there are illustrated two Peltier elements 19a and 19b, which are in surface contact with two heat distribution pieces 17a, 17b, and respectively with the extensions of the fastening element flanges. In the embodiment of FIG. 3, there is one Peltier element in surface contact with one heat distribution piece 17c. The number of Peltier elements per each CCD cell can be one, as in FIG. 3, or two, as in FIGS. 2 and 4. It is also possible to provide for instance two common Peltier elements 19a, 19b for all three CCD cells 6, 7, 8, as is illustrated in FIG. 5. There two heat distribution pieces 17a, 17b are arranged, by means of thermally conductive second glue joints 14, to be in contact with the end surfaces 25a, 25b of the flanges 34 of all fastening elements 9 of the CCD cells, of which heat distribution pieces the first 17a is thus common for all three first end surfaces 25a, and respectively the second heat distribution piece 17b is common for all three second end surfaces 25b. Consequently, in this fifth step, one or more Peltier elements 19a, 19b is attached to be tightly against the heat distribution pieces 17a, 17b, and said press joint can be any known or novel joint that is suitable for the purpose. Here the Peltier elements bring forth several advantageous effects. First of all, by suitably cooling the CCD cells, the temperature differences between the components of the joining construction—for example between the housing and the fastening element, and consequently between them and the prism—are made smaller than in known arrangements. This remarkably reduces the risk that the glue joints should fall apart. Therefore the Peltier elements are particularly advantageous, because simply by altering the direction of the current, the elements can be made on one hand to cool, and on the other hand to heat the heat distribution pieces 17a, 17b, 17c, or said extensions 36.

In order to minimize said temperature differences, the joining construction according to the invention further comprises a temperature sensor 25, which is attached to one or several of the CCD cells 6, 7 and 8, said temperature sensor being connected to an adjusting device that is not illustrated in the drawings but passes through the Peltier elements and adjusts the current and changes the voltage polarity when required, in order to maintain the temperature of the CCD cells at a predetermined value. This type of adjusting device is known in the prior art, and shall not be described in more detail. In cold conditions the polarity of the Peltier elements 19a, 19b can be chosen so that it heats the CCD cells 6, 7, 8, and at least in warm conditions the polarity of the Peltier element 19a, 19b is switched so that it cools the CCD cells 6, 7, 8. The above described structure of the invention transfers the heat created in the CCD cells 6, 7, 8 via the thermally conductive first glue joint 13 to the fastening element 9, and further either via one or several thermally conductive second glue joints 14 to the heat distribution pieces 17c or 17a, 17b alternatively directly to the fastening element extensions 36, and therethrough further to the Peltier elements 19a, 19b or 19c, wherefrom heat is removed by means of a blasting device or another method to the surrounding air, or it is conducted to the camera housing. In cold weather, the polarity of the Peltier elements can be reversed, and heat proceeds in a direction opposite to the one described in the above description.

In the method according to the invention, the hardening shrinkage of the third glue layer 11 does not have a remarkable role, because the fastening element 9 is essentially longer than the CCD cell 6, 7, 8, and thus the motion caused by the shrinkage is respectively smaller at the CCD cell than at the gluing spot itself. Therefore the hardening shrinkage of the third glue 11 can be larger than 1%. During operation, the temperature of the CCD cell may rise up to 80° C. without active heat transfer, in which case in known arrangements a good heat resistance also is required of the glue that is used for fastening in steps after the alignment of the CCD cell. In the structure of the present invention, the glue that is used for fastening after the alignment step, i.e. of the third glue 11, does not need to have a remarkable heat resistance, because the glue is placed between the fastening element and the prism housing 2, and not in the CCD cell itself. Moreover, heat is actively transferred away from the CCD cell, so that its temperature never rises too high.

In the specification above, the invention is described with reference to a few preferred embodiments only, and it is to be understood that some modifications can be made therein within the scope of the appended claims.

The invention claimed is:

1. A joining construction for mounting CCD cells of a color line camera in an aligned fashion on a color splitting prism, which is attached to a prism housing, each of said CCD cells having a light receiving input window and an opposite rear surface, said joining construction comprising: fastening elements having a length substantially larger than the length of the CCD cell and extending from a housing margin on one side of a light exit surface of said color splitting prism to another housing margin on the opposite side of said light exit surface; a first glue joint between the CCD cell and its fastening element, said first glue joint extending along the rear surface of said CCD cell and being of a thermally conductive glue; and third glue joints abutting said fastening element and said margins of the housing, said third glue joints being of a thermally insulating glue or cast plastic.

2. A joining construction of claim 1, comprising for each CCD cell:
   heat distribution piece(s), that extend(s):
      along the opposite sides of the housing and along the ends of said fastening element, or
      along the back side of the fastening element, whereupon each fastening element is further attached to said heat distribution pieces by second glue joints; or alternatively
   extensions of the fastening element, which extensions extend along the opposite sides of the housing.

3. A joining construction of claim 2, further comprising one or several Peltier elements, which is/are in surface contact with the heat distribution pieces in order to reduce the temperature differences between the joining construction components and the prism.

4. A joining construction of claim 3, further comprising a temperature sensor attached to the CCD cell in order to maintain its temperature at a predetermined value; whereupon in cold conditions, the polarity of the Peltier elements is arranged to heat the CCD cell, and in warm conditions, the polarity of the Peltier element is arranged cool the CCD cell.

5. A joining construction of claim 2, wherein the second glue joints are a thermally conductive glue with a heat transfer coefficient that is at least 0.6 W/m·K.

6. A joining construction of claim 2, wherein the heat distribution pieces or the fastening element extensions are attached by heat-insulating elements to the prism housing.

7. A joining construction of claim 6, wherein said elements are a fourth glue joint and/or a combination of an insulating layer and screws.

8. A joining construction of claim 7, wherein the fourth glue joints are thermally insulating glue or cast plastic, with a heat transfer coefficient that is no more than 0.3 W/m·K.

9. A joining construction of claim 2, wherein the material of the fastening element and the heat distribution pieces is metal, and that said metal is copper or aluminum or an alloy of either of these.

10. A joining construction of claim 1, wherein the thermally conductive glue has a heat transfer coefficient that is at least 0.6 W/m·K.

11. A joining construction of claim 1, wherein each fastening element includes front surfaces that are substantially parallel to the photosensitive surface of the CCD cell; at each exit surface said two housing margins are essentially parallel to said exit surface of the color splitting prism; and said front surfaces are supported against said housing margins.

12. A joining construction of claim 11, wherein in cross-section the fastening element of the CCD cell has the shape of a right-angled ]-profile that opens towards the prism, at the center of which profile the CCD cell is attached, and the end branches of said profile form said front surfaces.

13. A joining construction of claim 12, wherein the single areas of said front surfaces constitute no more than 20% or no more than 10% of the smooth area of the active side of the CCD cell, in order to obtain a small heat transfer surface.

14. A joining construction of claim 1, wherein the thermally insulating glue or cast plastic has a heat transfer coefficient that is no more than 0.3 Wm·K.

15. A joining construction of claim 1, wherein the material of the housing is metal or glass or ceramics.

16. A joining construction of claim 1, wherein the material of the fastening element and the heat distribution pieces is metal, and that said metal is copper or aluminum or an alloy of either of these.

17. A method for mounting CCD cells of a color line camera on a color splitting prism, which is in advance attached to a housing, the method of mounting each of the CCD cells having a light receiving input window and an opposite rear surface onto said prism comprising the steps of:
   creating a thermally conductive surface contact between the rear surface of the CCD cell and a fastening element that is essentially larger than the CCD cell by joining them together with a first thermally conductive glue provided therebetween;
   allowing said first glue to harden fixing the CCD cell to the fastening element;
   aligning the fastening element with the CCD cell fixed thereto at the correct position on said prism exit surface by moving said fastening element with respect to said housing; and
   gluing the fastening element, while maintaining the obtained alignment of the CCD cell, at least at two front surfaces located in the area of its outer margins and having areas substantially smaller than the area of the CCD cell, with a third glue abutting the prism housing.

18. A method of claim 17, further comprising the steps of:
   creating a thermally conductive surface contact between heat distribution pieces and the back side of the fastening element by joining them together with a second glue; and
   attaching the heat distribution pieces to the prism housing in a heat-insulating fashion and in order to make the structure rigid.

19. A method of claim 18, wherein the third glue is allowed to harden prior to the fastening of the heat distribution pieces with the second glue.

20. A method of claim 18, wherein the employed second glue are thermally conductive glues, with a heat transfer coefficient of at least 0.6 W/m·K.

21. A method of claim 17, further comprising the steps of:
using fastening elements having flanges with extensions, and
fastening said extensions of the fastening element to the prism housing in a heat-insulating fashion and in order to make the structure rigid.

22. A method of claim 17, wherein it further comprises a step of attaching one or several Peltier elements against fastening element extensions.

23. A method of claim 17, wherein heat distribution pieces and fastening element extensions are attached to the prism housing:
with a fourth thermally insulating glue; or
by arranging an insulation between the heat distribution pieces and the prism housing, and by fastening the heat distribution pieces to the housing by mechanical fastening elements.

24. A method of claim 23, wherein the employed fourth glue are thermally insulating glues or cast plastics with a heat transfer coefficient of no more than 0.3 W/m·K.

25. A method of claim 17, wherein the employed first glue is a thermally conductive glue, with a heat transfer coefficient of at least 0.6 W/m·K.

26. A method of claim 17, wherein the employed third glue is a thermally insulating glues or cast plastics with a heat transfer coefficient of no more than 0.3 W/m·K.

27. A method for mounting CCD cells of a color line camera on a color splitting prism, which is in advance attached to a housing, the method of mounting each of the CCD cells onto said prism comprising the steps of:
creating a thermally conductive surface contact between the CCD cell and a fastening element that is essentially larger than the CCD cell by joining them together with a first glue;
aligning the fastening element with the CCD cell at the correct position on said prism exit surface;
gluing the fastening element, while maintaining the obtained alignment of the CCD cell, at least at two front surfaces located in the area of its outer margins and having areas substantially smaller than the area of the CCD cell, with a third glue to the prism housing;
creating a thermally conductive surface contact between heat distribution pieces and the ends of the fastening element by joining them together with a second glue; and
attaching the heat distribution pieces to the prism housing in a heat-insulating fashion and in order to make the structure rigid.

28. A method of claim 27, wherein it further comprises a step of attaching one or several Peltier elements against the heat distribution pieces.

29. A method of claim 27, wherein the third glue is allowed to harden prior to the fastening of the heat distribution pieces with the second glue.

30. A method of claim 27, wherein the employed second glue are thermally conductive glues, with a heat transfer coefficient of at least 0.6 W/m·k.

* * * * *

UNITED STATES PATENT AND TRADEMARK OFFICE
CERTIFICATE OF CORRECTION

| | |
|---|---|
| PATENT NO. | : 7,023,480 B2 |
| APPLICATION NO. | : 09/878768 |
| DATED | : April 4, 2006 |
| INVENTOR(S) | : Paavola et al. |

It is certified that error appears in the above-identified patent and that said Letters Patent is hereby corrected as shown below:

At column 4, line 2, please replace "f" with --of--.

At column 7, line 32, please replace "W/mK" with --W/m·K--.

At column 8, line 15, please replace "There" with --The--.

At column 10, line 29, claim 14, line 3, please replace "Wm·K" with --W/m·K--.

Signed and Sealed this

Fifth day of September, 2006

JON W. DUDAS
*Director of the United States Patent and Trademark Office*